United States Patent
Lee et al.

(10) Patent No.: US 9,622,110 B2
(45) Date of Patent: Apr. 11, 2017

(54) METHOD AND DEVICE FOR RANGING IN A WIRELESS COMMUNICATION SYSTEM

(75) Inventors: Jin Lee, Anyang-si (KR); In Uk Jung, Anyang-si (KR); Jin Soo Choi, Anyang-si (KR); Gi Won Park, Anyang-si (KR); Young Soo Yuk, Anyang-si (KR); Jeong Ki Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 339 days.

(21) Appl. No.: 14/004,582

(22) PCT Filed: Dec. 12, 2011

(86) PCT No.: PCT/KR2011/009542
§ 371 (c)(1),
(2), (4) Date: Sep. 11, 2013

(87) PCT Pub. No.: WO2012/124881
PCT Pub. Date: Sep. 20, 2012

(65) Prior Publication Data
US 2014/0003410 A1    Jan. 2, 2014

Related U.S. Application Data

(60) Provisional application No. 61/452,589, filed on Mar. 14, 2011, provisional application No. 61/474,729, filed on Apr. 12, 2011.

(51) Int. Cl.
*H04W 28/24* (2009.01)
*H04W 28/04* (2009.01)
(Continued)

(52) U.S. Cl.
CPC ......... *H04W 28/044* (2013.01); *H04W 74/00* (2013.01); *H04W 4/005* (2013.01);
(Continued)

(58) Field of Classification Search
CPC ..... H04W 68/02; H04W 92/18; H04W 28/18; H04W 4/005; H04W 74/00; H04W 28/044
See application file for complete search history.

(56) References Cited

U.S. PATENT DOCUMENTS

| 2011/0194529 A1* | 8/2011 | Cho | ................ | H04L 5/0007 |
| | | | | 370/331 |
| 2012/0106481 A1* | 5/2012 | Cho | ................ | H04L 1/1671 |
| | | | | 370/329 |

(Continued)

FOREIGN PATENT DOCUMENTS

| KR | 1020110003248 A | 1/2011 |
| KR | 1020110049638 A | 5/2011 |
| WO | 2011002241 A2 | 1/2011 |

OTHER PUBLICATIONS

IEEE802.16 Broadband Wireless Access Working Group: "Network reentry from idle mode for M2M devices without mobility", Mar. 16, 2011, Huang et al.

(Continued)

*Primary Examiner* — Ajay Cattungal
(74) *Attorney, Agent, or Firm* — Dentons US LLP

(57) ABSTRACT

Provided are a method and device for ranging in a wireless communication system. A machine-to-machine (M2M) device receives an advanced air interface-system configuration descriptor (AAI-SCD) message including information on a dedicated ranging channel for the M2M device and an M2M parameter change count from a base station, and attempts ranging through the dedicated ranging channel to the base station. At this point, the M2M parameter change count orders information on the dedicated ranging channel in the AAI-SCD message to change.

17 Claims, 9 Drawing Sheets

(51) Int. Cl.
*H04W 74/00* (2009.01)
*H04W 4/00* (2009.01)
*H04W 28/18* (2009.01)
*H04W 92/18* (2009.01)
*H04W 68/02* (2009.01)

(52) U.S. Cl.
CPC ............ *H04W 28/18* (2013.01); *H04W 68/02* (2013.01); *H04W 92/18* (2013.01)

(56) References Cited

U.S. PATENT DOCUMENTS

| | | | | |
|---|---|---|---|---|
| 2012/0231828 A1* | 9/2012 | Wang | .................... | H04W 74/04 455/509 |
| 2013/0072245 A1* | 3/2013 | Lee | ...................... | H04W 4/005 455/509 |
| 2013/0244652 A1* | 9/2013 | Park | .................... | H04W 74/002 455/435.1 |
| 2013/0252643 A1* | 9/2013 | Park | ........................ | H04W 8/24 455/458 |
| 2013/0260801 A1* | 10/2013 | Kim | ...................... | H04W 4/005 455/458 |
| 2013/0343323 A1* | 12/2013 | Kang | .................... | H04W 72/04 370/329 |
| 2014/0056249 A1* | 2/2014 | Park | ...................... | H04W 24/10 370/329 |

OTHER PUBLICATIONS

Wei-Chieh Huang, et al.:"Network reentry from idle mode for M2M devices without mobility", IEEE Draft, C80216p-11_0040R1, IEEE-SA, Piscataway, NJ, USA, vol. 802.16p, Mar. 11, 2011, pp. 1-5, XP017712518.

"Draft Amendment to IEEE Standard for Local and metropolitan area networks Part 16: Air Interface for Broadband Wireless Access Systems", IEEE Draft, P80216M_D12, IEEE-SA, Piscataway, NJ, USA, vol. 802.16m, No. D12, Feb. 18, 2011, pp. 1-1120, XP017716364.

Jinsoo Choi, et al.:"Consideration on the Update Procedure of the System Information for M2M", IEEE Draft, C80216P-10_0023, IEEE-SA, Piscataway, NJ, USA, vol. 802.16p, Dec. 30, 2010, pp. 1-10, XP017712445.

Honggang Li, et al.:"Optimized schemes of network re-entry for M2M in 16m", IEEE Draft, C80216P-11_0092R3, IEEE-SA, Piscataway, NJ, USA, vol. 802.16p, May 8, 2011, pp. 1-8, XP017712673.

* cited by examiner

METHOD AND DEVICE FOR RANGING IN A WIRELESS COMMUNICATION SYSTEM

This application is the U.S. National Phase of International Application Number PCT/KR2011/009542 filed on Dec. 12, 2011, which claims priority to U.S. Provisional Application No. 61/452,589 filed Mar. 14, 2011, and U.S. Provisional Application No. 61/474,729 filed Apr. 12, 2011, all of which are incorporated by reference for all purposes as if fully set forth herein.

BACKGROUND OF THE INVENTION

Field of the Invention

The present invention relates to a wireless communication, and more particularly, to a method and apparatus for ranging in a wireless communication system.

Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., 4th generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

There is ongoing development on the IEEE 802.16p standard optimized for machine-to-machine (M2M) communication based on the IEEE 802.16e standard and the IEEE 802.16m standard. The M2M communication can be defined as an information exchange performed between a subscriber station and a server or between subscriber stations in a core network without any human interaction. In the IEEE 802.16p standard, there is an ongoing discussion on enhancement of medium access control (MAC) of the IEEE 802.16 standard and a minimum change of an orthogonal frequency division multiple access (OFDMA) physical layer (PHY) in licensed bands. Due to the discussion on the IEEE 802.16p standard, a wide area wireless coverage is required in the licensed band, and a scope of applying automated M2M communication can be increased for an observation and control purpose.

When accessing a network, requirements demanded by many M2M applications are significantly different from requirements for human-initiated or human-controlled network access. The M2M application can include vehicular telematics, healthcare monitoring of bio-sensors, remote maintenance and control, smart metering, an automated service of a consumer device, etc. The requirements of the M2M application can include very lower power consumption, larger numbers of devices, short burst transmission, device tampering detection and reporting, improved device authentication, etc.

Ranging implies a process for maintaining quality of radio frequency (RF) communication between the UE and the BS. According to the ranging, a timing offset, a frequency offset, and a power adjustment value can be accurately obtained, and transmission of the UE can be aligned with the BS. A plurality of M2M devices can perform contention-based ranging with each other. The plurality of M2M devices may belong to an M2M group. M2M devices belonging to the same M2M group share a criterion of the same M2M service application and/or the same M2M user.

Meanwhile, data which an M2M device needs to transmit is not frequently generated and there is a high possibility that a time required to transmit or receive the data will also be very short. As a result, when a section in which the M2M device transmits or receives the data is excluded, it is anticipated that the M2M device will operated in an idle mode during most time. However, when a paging message is transmitted to the M2M device from a network in order to transmit data to a lot of M2M devices that belong to the idle mode, the plurality of M2M devices that receives the paging message may simultaneously perform ranging in order to receive the data. It is assumed that the M2M device can receive the data only in a connected state. Further, even when it is anticipated that the data is transmitted to an M2M server from a plurality of M2M devices that belongs to a specific M2M group simultaneously, the plurality of M2M devices may perform ranging simultaneously.

Therefore, dedicated ranging channel and resources for the M2M device need to be configured in order to prevent a collision and minimize an influence on existing human type communication (HTC) devices when the plurality of M2M devices attempts ranging.

SUMMARY OF THE INVENTION

The present invention provides a method and apparatus for ranging in a wireless communication system. The present invention provides a method and apparatus for ranging having an advantage of allocate a dedicated ranging channel for only M2M devices.

In an aspect, a method for ranging, by a machine-to-machine (M2M) device, in a wireless communication system is provided. The method includes receiving a system configuration descriptor (AAI-SCD) message including information on a dedicated ranging channel for the M2M device and a M2M parameter change count from a base station, and attempting ranging to the base station through the dedicated ranging channel. The M2M parameter change count indicates that the information on the dedicated ranging channel in the AAI-SCD message is changed.

The M2M parameter change count may be increased by 1 mod 16 whenever the information on the dedicated ranging channel is changed.

The M2M parameter change count may be an integer of one of 1 to 15.

The AAI-SCD message may include information on a set of dedicated ranging codes for the M2M device.

The ranging may be attempted based on one dedicated ranging code selected among the set of dedicated ranging codes.

The one dedicated ranging code may be a dedicated ranging code corresponding to paging order mod the number of dedicated ranging codes.

The method may further include receiving a paging advertisement (AAI-PAG-ADV) message including the M2M parameter change count.

The AAI-PAG-ADV message may include a ranging window size determined based on the number of paged M2M devices.

The ranging may be attempted in a ranging opportunity calculated by paging order mod the ranging widow size.

The ranging may be attempted in a ranging opportunity calculated by identifier (ID) of the M2M device mod the ranging widow size.

The AAI-PAG-ADV message may include a ranging access type indicator for a M2M group in which the M2M device is included.

In another aspect, a machine-to-machine (M2M) device in a wireless communication system is provided. The M2M device includes a radio frequency (RF) unit transmitting or receiving a radio signal, and a processor connected with the RF unit, and configured to receive a system configuration descriptor (AAI-SCD) message including information on a dedicated ranging channel for the M2M device and a M2M parameter change count from a base station, attempt ranging to the base station through the dedicated ranging channel. The M2M parameter change count indicates that the information on the dedicated ranging channel in the AAI-SCD message is changed.

According to embodiments of the present invention, it is possible to lower possibility of collision when a lot of M2M devices attempt ranging at the same time.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

IEEE 802.16m is chiefly described as an example in order to clarify the description, but the technical spirit of the present invention is not limited to IEEE 802.16m.

Figure 1:
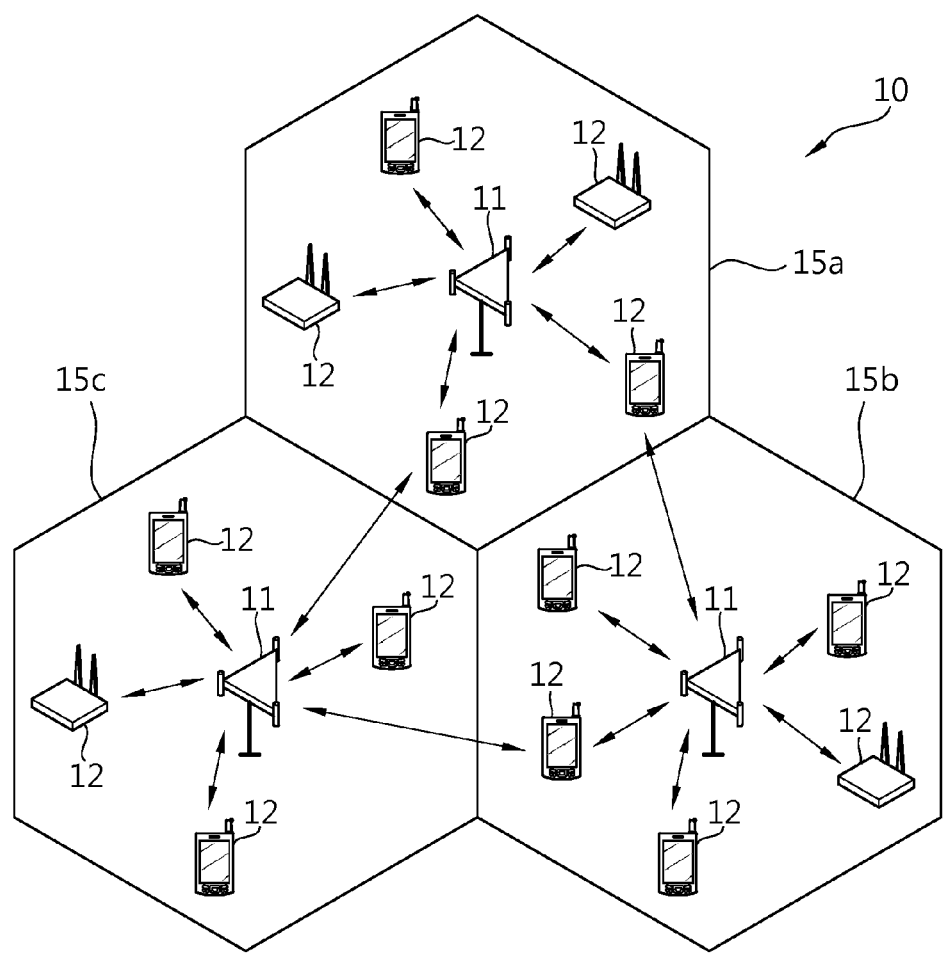
FIG. 1 shows a wireless communication system.

FIG. 1 shows a wireless communication system.

Referring to FIG. 1, the wireless communication system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE generally belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
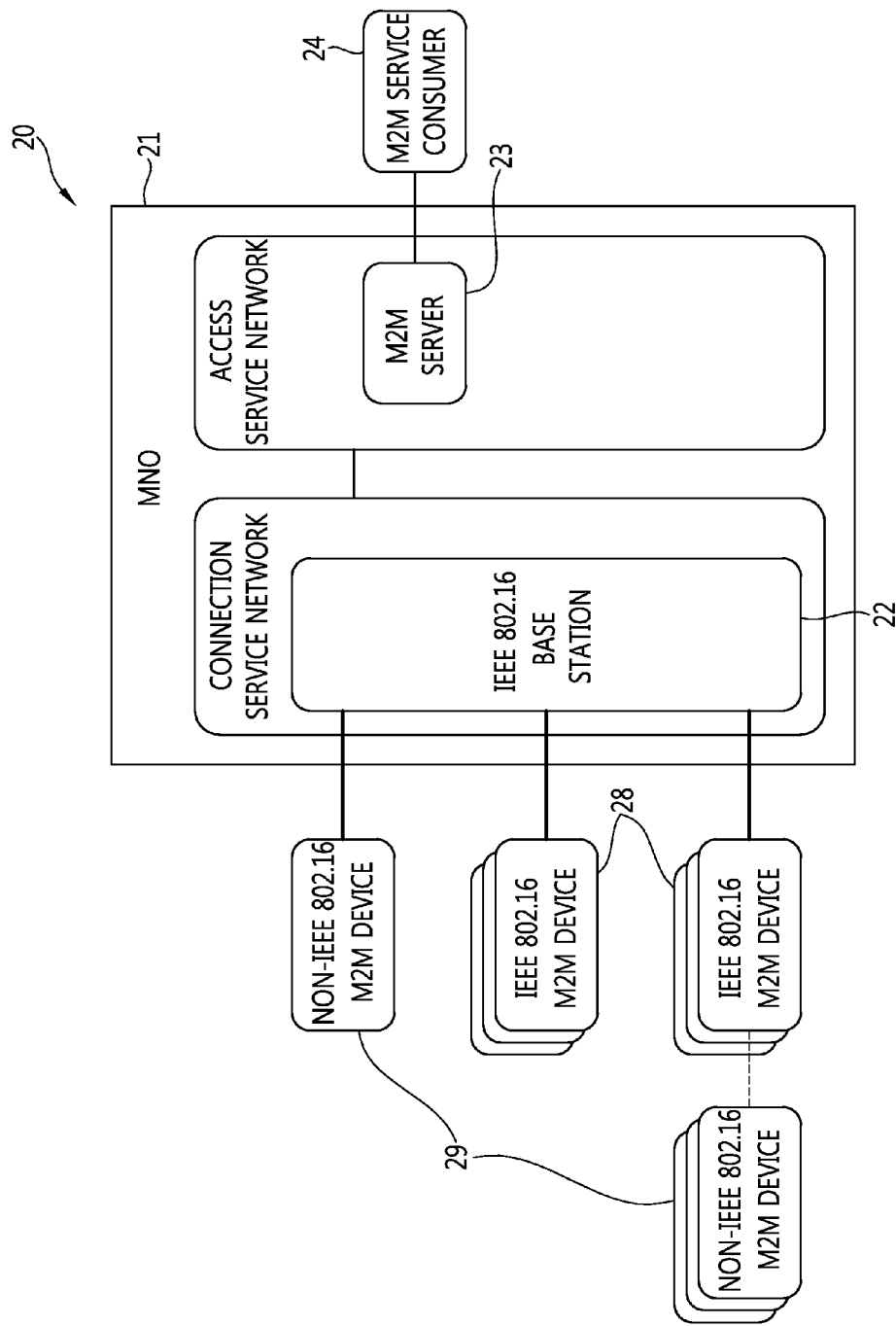
FIG. 2 shows basic M2M service system architecture.
Figure 3:
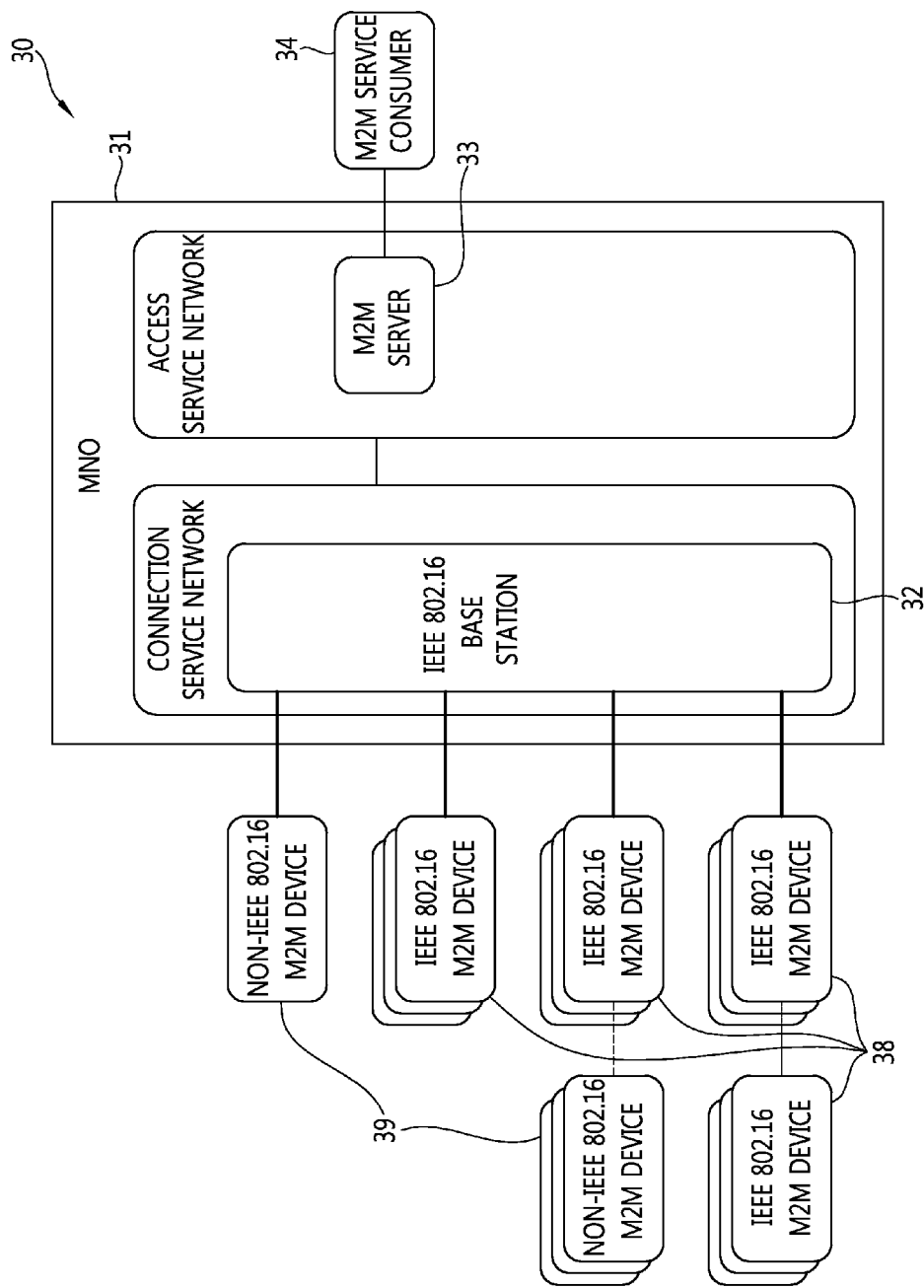
FIG. 3 shows advanced M2M service system architecture.

FIGS. 2 and 3 show examples of system architecture of IEEE 802.16 supporting machine-to-machine (M2M) communication.

FIG. 2 shows basic M2M service system architecture. A basic M2M service system architecture 20 includes a mobile network operator (MNO) 21, a M2M service consumer 24, at least one IEEE 802.16 M2M device (hereinafter, 802.16 M2M device) 28, and at least one non-IEEE 802.16 M2M device 29. The MNO 21 includes an access service network (ASN) and a connectivity service network (CSN). The 802.16 M2M device 28 is an IEEE 802.16 mobile station (MS) having a M2M functionality. A M2M server 23 is an entity for communicating with one or more 802.16 M2M devices 28. The M2M server 23 has an interface accessibly by the M2M service consumer 24. The M2M service consumer 24 is a user of a M2M service. The M2M server 23 may be located inside or outside the CSN, and can provide a specific M2M service to the one or more 802.16 M2M devices 28. The ASN may include an IEEE 802.16 base station (BS) 22. A M2M application operates based on the 802.16 M2M device 28 and the M2M server 23.

The basic M2M service system architecture 20 supports two types of M2M communication, i.e., M2M communication between one or more 802.16 M2M devices and a M2M server or point-to-multipoint communication between the 802.16 M2M devices and an IEEE 802.16 BS. The basic M2M service system architecture of FIG. 2 allows the 802.16 M2M device to operate as an aggregation point for a non-IEEE 802.16 M2M device. The non-IEEE 802.16 M2M device uses a radio interface different from IEEE 802.16 such as IEEE 802.11, IEEE 802.15, PLC, or the like. In this case, the non-IEEE 802.16 M2M device is not allowed to change the radio interface to IEEE 802.16.

FIG. 3 shows advanced M2M service system architecture. In the advanced M2M service system architecture, an 802.16 M2M device can operate as an aggregation point for a non-IEEE 802.16 M2M device, and also can operate as an aggregation point for an 802.16 M2M device. In this case, in order to perform an aggregation function for the 802.16 M2M device and the non-802.16 M2M device, the radio interface can be changed to IEEE 802.16. In addition, the advanced M2M service system architecture can support a peer-to-peer (P2P) connection between 802.16 M2M devices. In this case, the P2P connection can be established on either IEEE 802.16 or another radio interface such as IEEE 802.11, IEEE 802.15, PLC, or the like.

Hereinafter, IEEE 802.16e and IEEE 802.16m frame structures will be described.

Figure 4:
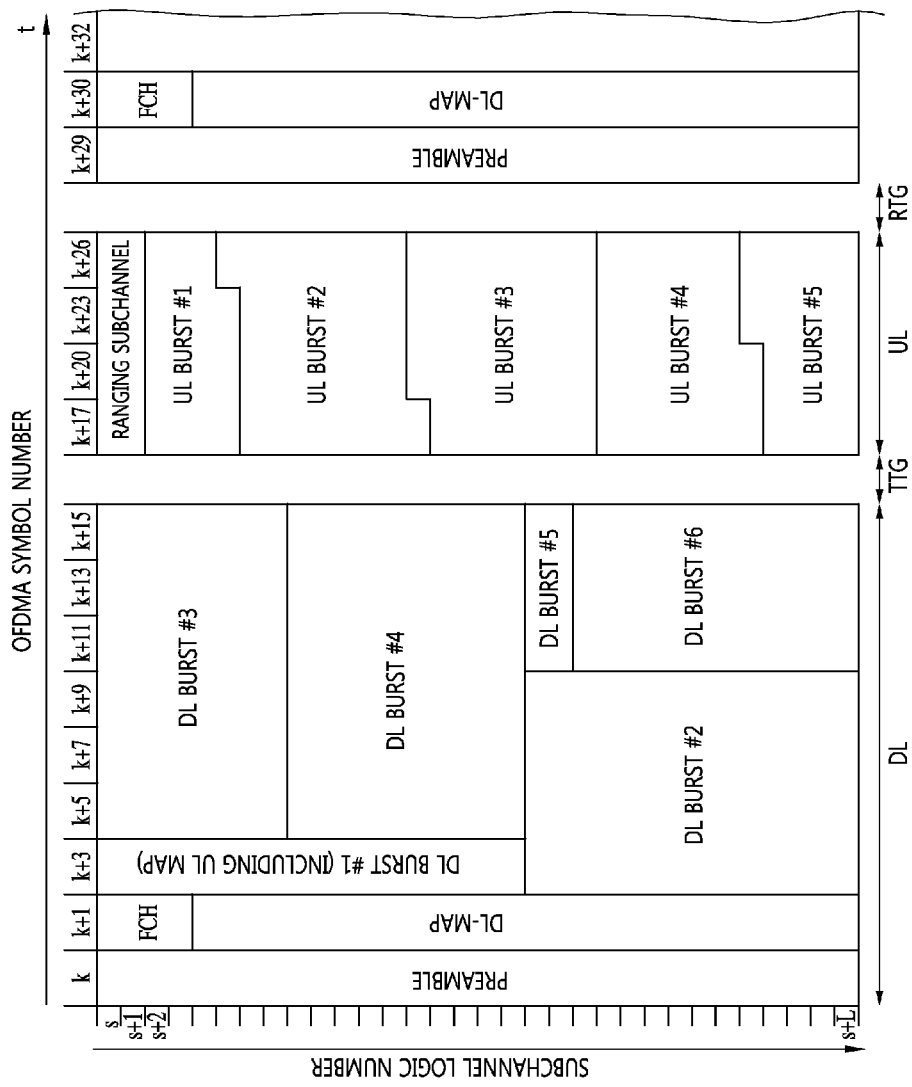
FIG. 4 shows an example of an IEEE 802.16e frame structure.

FIG. 4 shows an example of an IEEE 802.16e frame structure.

A time division duplex (TDD) frame structure of IEEE 802.16e is shown in FIG. 4. The TDD frame includes a downlink (DL) transmission period and an uplink (UL) transmission period. The DL transmission period temporally precedes the UL transmission period. The DL transmission period sequentially includes a preamble, a frame control header (FCH), a DL-MAP, a UL-MAP, and a DL burst region. The UL transmission period includes a ranging subchannel and a UL burst region. A guard time for identifying the UL transmission period and the DL transmission period is inserted to a middle portion (between the DL transmission period and the UL transmission period) and a last portion (next to the UL transmission period) of the frame. A transmit/receive transition gap (TTG) is a gap between a DL burst and a subsequent UL burst. A receive/transmit transition gap (RTG) is a gap between a UL burst and a subsequent DL burst.

A preamble is used between a BS and an MS for initial synchronization, cell search, and frequency-offset and channel estimation. The FCH includes information on a length of a DL-MAP message and a coding scheme of the DL-MAP. The DL-MAP is a region for transmitting the DL-MAP message. The DL-MAP message defines access to a DL channel. This implies that the DL-MAP message defines DL channel indication and/or control information. The DL-MAP message includes a configuration change count of a downlink channel descriptor (DCD) and a BS identifier (ID). The DCD describes a DL burst profile applied to a current MAP. The DL burst profile indicates characteristics of a DL physical channel. The DCD is periodically transmitted by the BS by using a DCD message. The UL-MAP is a region for transmitting a UL-MAP message. The UL-MAP message defines access to a UL channel. This implies that the UL-MAP message defines UL channel indication and/or control information. The UL-MAP message includes a configuration change count of an uplink channel descriptor (UCD) and also includes an effective start time of UL allocation defined by the UL-MAP. The UCD describes a UL burst profile. The UL burst profile indicates characteristics of a UL physical channel. The UCD is periodically transmitted by the BS by using a UCD message. The DL burst is a region for transmitting data sent by the BS to the MS. The UL burst is a region for transmitting data sent by the MS to the BS. The fast feedback region is included in a UL burst region of a frame. The fast feedback region is used to transmit information that requires a fast response from the BS. The fast feedback region can be used for CQI transmission. A location of the fast feedback region is determined by the UL-MAP. The location of the fast feedback region may be a fixed location in the frame, or may be a variable location.

Figure 5:
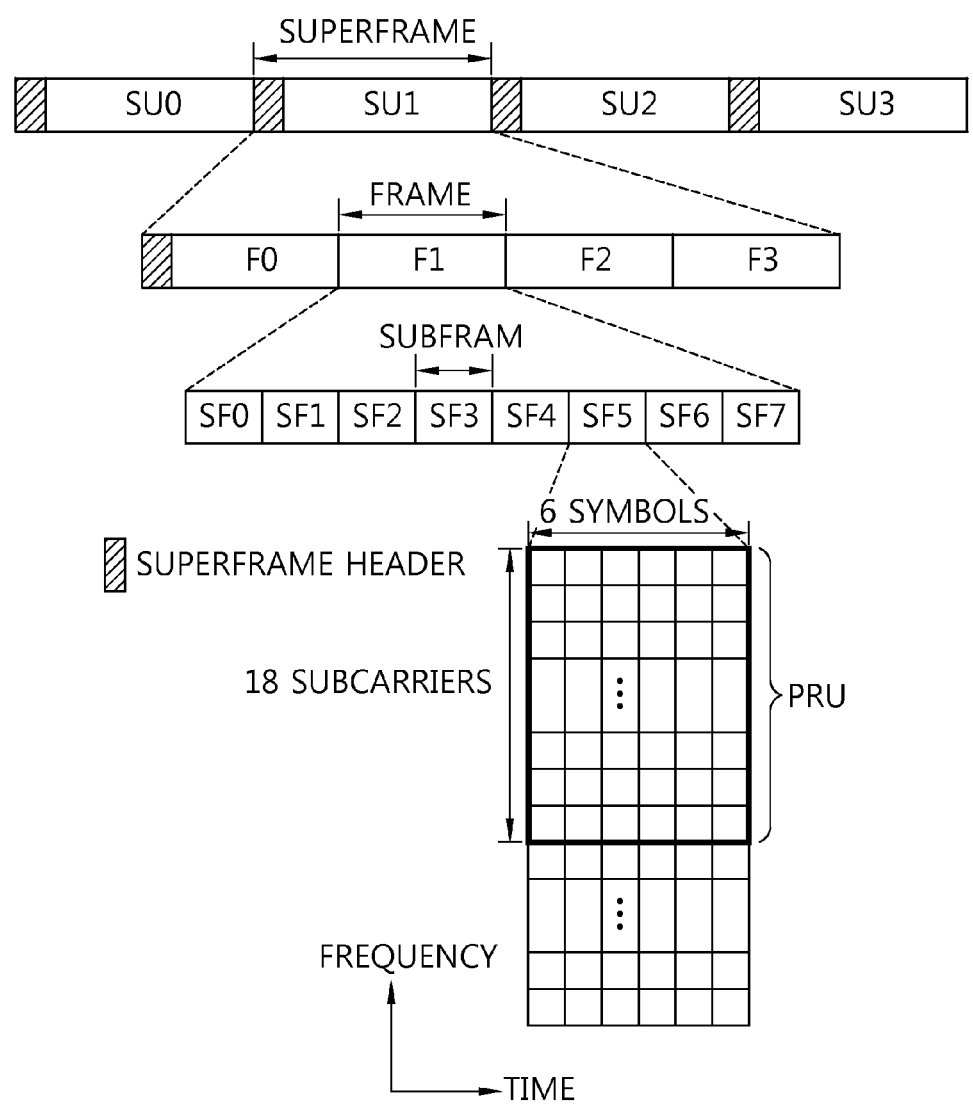
FIG. 5 shows an example of an IEEE 802.16m frame structure.

FIG. 5 shows an example of an IEEE 802.16m frame structure.

Referring to FIG. 5, a superframe (SF) includes a superframe header (SFH) and four frames F0, F1, F2, and F3. Each frame may have the same length in the SF. Although it is shown that each SF has a size of 20 milliseconds (ms) and each frame has a size of 5 ms, the present invention is not limited thereto. A length of the SF, the number of frames included in the SF, the number of SFs included in the frame, or the like may change variously. The number of SFs included in the frame may change variously according to a channel bandwidth and a cyclic prefix (CP) length.

One frame includes 8 subframes SF0, SF1, SF2, SF3, SF4, SF5, SF6, and SF7. Each subframe can be used for UL or DL transmission. One subframe includes a plurality of orthogonal frequency division multiplexing (OFDM) symbols or orthogonal frequency division multiple access (OFDMA) symbols in a time domain, and includes a plurality of subcarriers in a frequency domain. An OFDM symbol is for representing one symbol period, and can be referred to as other terminologies such as an OFDMA symbol, an SC-FDMA symbol, etc., according to a multiple access scheme. The subframe can consist of 5, 6, 7, or 9 OFDMA symbols. However, this is for exemplary purposes only, and thus the number of OFDMA symbols included in the subframe is not limited thereto. The number of OFDMA symbols included in the subframe may change variously according to a channel bandwidth and a CP length. A subframe type may be defined according to the number of OFDMA symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes each having the same type. Alternatively, one frame may include subframes each having a different type. That is, the number of OFDMA symbols included in each subframe may be identical or different in one frame. Alternatively, the number of OFDMA symbols included in at least one subframe of one frame may be different from the number of OFDMA symbols of the remaining subframes of the frame.

Time division duplex (TDD) or frequency division duplex (FDD) can be applied to the frame. In the TDD, each subframe is used in UL or DL transmission at the same frequency and at a different time. That is, subframes included in a TDD frame are divided into a UL subframe and a DL subframe in the time domain. In the FDD, each subframe is used in UL or DL transmission at the same time and at a different frequency. That is, subframes included in an FDD frame are divided into a UL subframe and a DL subframe in the frequency domain. UL transmission and DL transmission occupy different frequency bands and can be simultaneously performed.

A superframe header (SFH) can carry an essential system parameter and system configuration information. The SFH may be located in a first subframe in a superframe. The SFH may occupy last 5 OFDMA symbols of the first subframe. The SFH can be classified into a primary-SFH (P-SFH) and a secondary-SFH (S-SFH). The P-SFH may be transmitted in every superframe. Information transmitted on the S-SFH can be divided into 3 sub-packets, i.e., S-SFH SP1, S-SFH SP2, and S-SFH SP3. Each sub-packet can be transmitted periodically with a different periodicity. Information transmitted through the S-SFH SP1, the S-SFH SP2, and the S-SFH SP3 may be different from one another. The S-SFH SP1 may be transmitted with the shortest period, and the S-SFH SP3 may be transmitted with the longest period. The S-SFH SP1 includes information on network re-entry, and a transmission period of the S-SFH SP1 may be 40 ms. The S-SFH SP2 includes information on initial network entry and network discovery, and a transmission period of the S-SFH SP2 may be 80 ms. The S-SFH SP3 includes other important system information, and a transmission period of the S-SFH SP3 may be either 160 ms or 320 ms.

One OFDMA symbol includes a plurality of subcarriers, and the number of subcarriers is determined according to a fast Fourier transform (FFT) size. There are several types of subcarriers. A subcarrier type may include a data subcarrier for data transmission, a pilot subcarrier for various estimations, and a null carrier for a guard band and a DC carrier. A parameter for characterizing an OFDMA symbol includes BW, $N_{used}$, n, G, etc. BW denotes a nominal channel bandwidth. $N_{used}$ denotes the number of subcarriers in use (including a DC subcarrier). n denotes a sampling factor. This parameter is used to determine a subcarrier spacing and a useful symbol time together with BW and $N_{used}$. G denotes a ratio of a CP time and a useful time.

Table 1 below shows an OFDMA parameter. The OFDMA parameter of Table 1 can equally apply to the 802.163 frame structure of FIG. 4

In Table 1, $N_{FFT}$ is smallest power of two greater than $N_{used}$. A sampling factor $F_s$ is floor(n·BW/8000)×8000, a subcarrier spacing $\Delta f$ is $F_s/N_{FFT}$, a useful symbol time $T_b$ is $1/\Delta$, a CP time $T_g$ is $G·T_b$, an OFDMA symbol time $T_s$ is $T_b+T_g$, and a sampling time is $T_b/N_{FFT}$.

Hereinafter, ranging will be described. The ranging means a series of processes for maintaining quality of RF communication between a user equipment and a base station. Accurate values of timing offset, frequency offset, and power adjustment may be acquired by the ranging, and transmission of the user equipment may be aligned with the base station.

Figure 6:
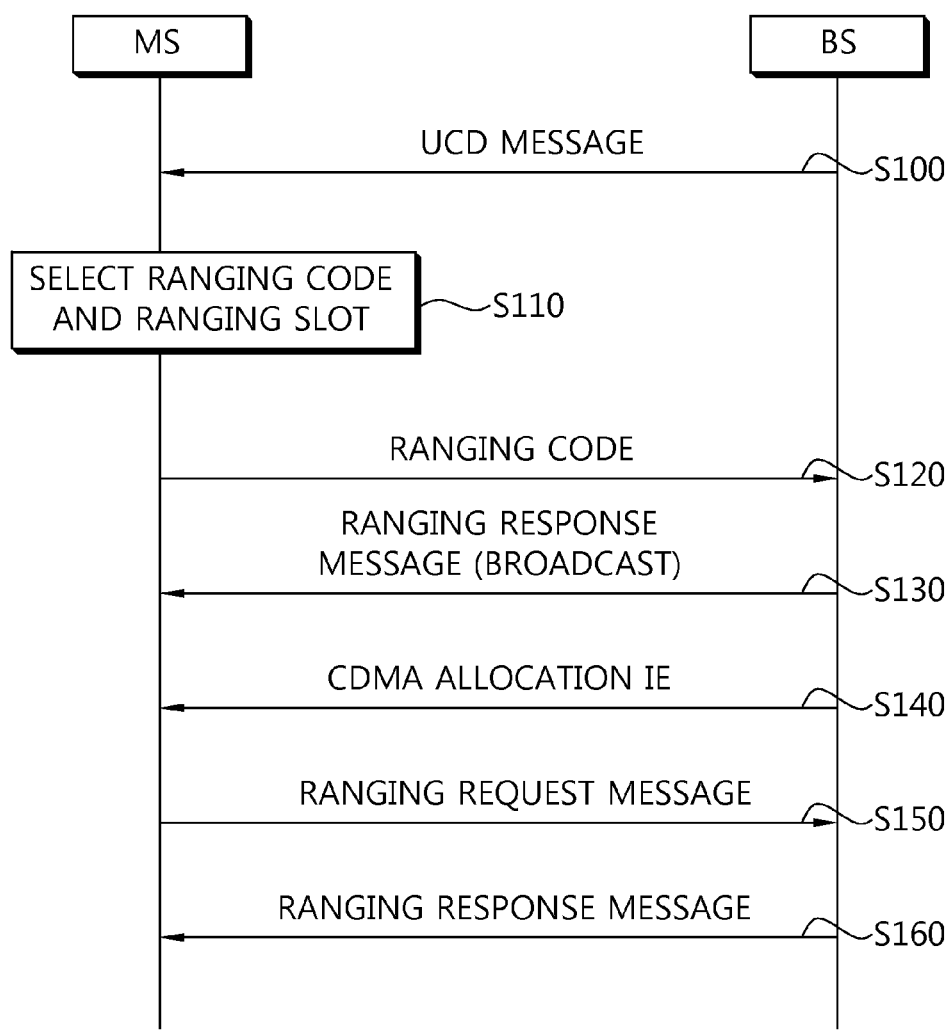
FIG. 6 shows an example of a ranging process of IEEE 802.16e.

FIG. 6 shows an example of a ranging process of IEEE 802.16e.

In step S100, the MS receives a UCD message from the BS. In a system, a set of a ranging subchannels and special pseudonoise codes may be defined. In the UCD message, a subset of the special pseudonoise codes may be allocated for initial ranging, periodic ranging, or bandwidth request (BR). The BS may determine an object of codes according to a subset belonging to the codes. In the embodiment, the subset of the codes for initial ranging may be allocated in the UCD message.

In step S110, the MS selects one of the ranging codes in an appropriate subset at equal probability. Further, the MS selects one ranging slot among ranging slots usable on an uplink subframe at equal probability. When selecting one ranging slot, the MS may use random selection or random backoff. In the case of using the random selection, the MS selects one ranging slot among all usable slots in one frame through a uniform random process. In the case of using the random backoff, the MS selects one ranging slot among all

TABLE 1

| | | 5 | 7 | 8.75 | 10 | 20 |
|---|---|---|---|---|---|---|
| Channel bandwidth, BW(MHz) | | 5 | 7 | 8.75 | 10 | 20 |
| Sampling factor, n | | 28/25 | 8/7 | 8/7 | 28/25 | 28/25 |
| Sampling frequency, $F_s$(MHz) | | 5.6 | 8 | 10 | 11.2 | 22.4 |
| FFT size, $N_{FFT}$ | | 512 | 1024 | 1024 | 1024 | 2048 |
| Subcarrier spacing, $\Delta f$(kHz) | | 10.94 | 7.81 | 9.77 | 10.94 | 10.94 |
| Useful symbol time, $T_b$(μs) | | 91.4 | 128 | 102.4 | 91.4 | 91.4 |
| G = 1/8 | Symbol time, $T_s$ (μs) | 102.857 | 144 | 115.2 | 102.857 | 102.857 |
| | FDD Number of ODFMA symbols per 5 ms frame | 48 | 34 | 43 | 48 | 48 |
| | Idle time (μs) | 62.857 | 104 | 46.40 | 62.857 | 62.857 |
| | TDD Number of ODFMA symbols per 5 ms frame | 47 | 33 | 42 | 47 | 47 |
| | TTG + RTG (μs) | 165.714 | 248 | 161.6 | 165.714 | 165.714 |
| G = 1/16 | Symbol time, $T_s$(μs) | 97.143 | 136 | 108.8 | 97.143 | 97.143 |
| | FDD Number of ODFMA symbols per 5 ms frame | 51 | 36 | 45 | 51 | 51 |
| | Idle time (μs) | 45.71 | 104 | 104 | 45.71 | 45.71 |
| | TDD Number of ODFMA symbols per 5 ms frame | 50 | 35 | 44 | 50 | 50 |
| | TTG + RTG (μs) | 142.853 | 240 | 212.8 | 142.853 | 142.853 |
| G = 1/4 | Symbol time, $T_s$ (μs) | 114.286 | 160 | 128 | 114.286 | 114.286 |
| | FDD Number of ODFMA symbols per 5 ms frame | 43 | 31 | 39 | 43 | 43 |
| | Idle time (μs) | 85.694 | 40 | 8 | 85.694 | 85.694 |
| | TDD Number of ODFMA symbols per 5 ms frame | 42 | 30 | 38 | 42 | 42 |
| | TTG + RTG (μs) | 199.98 | 200 | 136 | 199.98 | 199.98 |
| Number of Guard subcarriers | Left | 40 | 80 | 80 | 80 | 160 |
| | Right | 39 | 79 | 79 | 79 | 159 |
| Number of used subcarriers | | 433 | 865 | 865 | 865 | 1729 |
| Number of PRU in type-1 subframe | | 24 | 48 | 48 | 48 | 96 | usable slots in a corresponding backoff window through the uniform random process. In step S120, the MS transmits the selected ranging code to the BS through the selected ranging slot.

In step S130, in order to notify that the ranging code is successfully received, the BS broadcasts a ranging response message including the received ranging code and the ranging slot receiving the ranging code. The BS does not know which MS transmits the ranging code. By the ranging response message, the MS transmitting the ranging code may verify the ranging response message corresponding to the ranging code transmitted by the MS.

In step S140, the BS transmits a CDMA allocation information element (IE) to the MS. The BS may provide a bandwidth to which the MS transmits a ranging request message by the CDMA allocation IE. In step S150, the MS transmits the ranging request message to the BS. In step S160, the BS transmits the ranging response message to the MS, and as a result, the ranging process ends.

Meanwhile, in the ranging process of FIG. 6, the number of contention ranging retries may be defined. A timer may operate while the MS waits in order to receive the ranging response message in step S130 or step S160, or while the MS waits in order to receive the CDMA allocation IE in step S140. The timer may be terminated when the ranging code transmitted by the MS collides with the ranging code transmitted by another MS or is not accurately received from the BS. When the timer expires, the number of contention ranging retries is increased by 1, and the MS performs the ranging process again from step S100. When the ranging is continuously aborted and thus the number of contention ranging retries reaches a predetermined value, the MS searches a new channel.

Further, the UCD message may be transmitted by the BS at a predetermined period. The UCD message may include a configuration change count, and the configuration change count in the UCD message is not also changed so long as the UCD message is not changed. An UL-MAP message which allocates transmission or reception by using a burst profile defined in the UCD message having a given configuration change count has the same UCD count value as the configuration change count in a corresponding UCD message. The configuration change count in the UCD message is increased by 1 modulo 256 whenever a set of channel descriptors, that is, burst profiles is newly generated.

Figure 7:
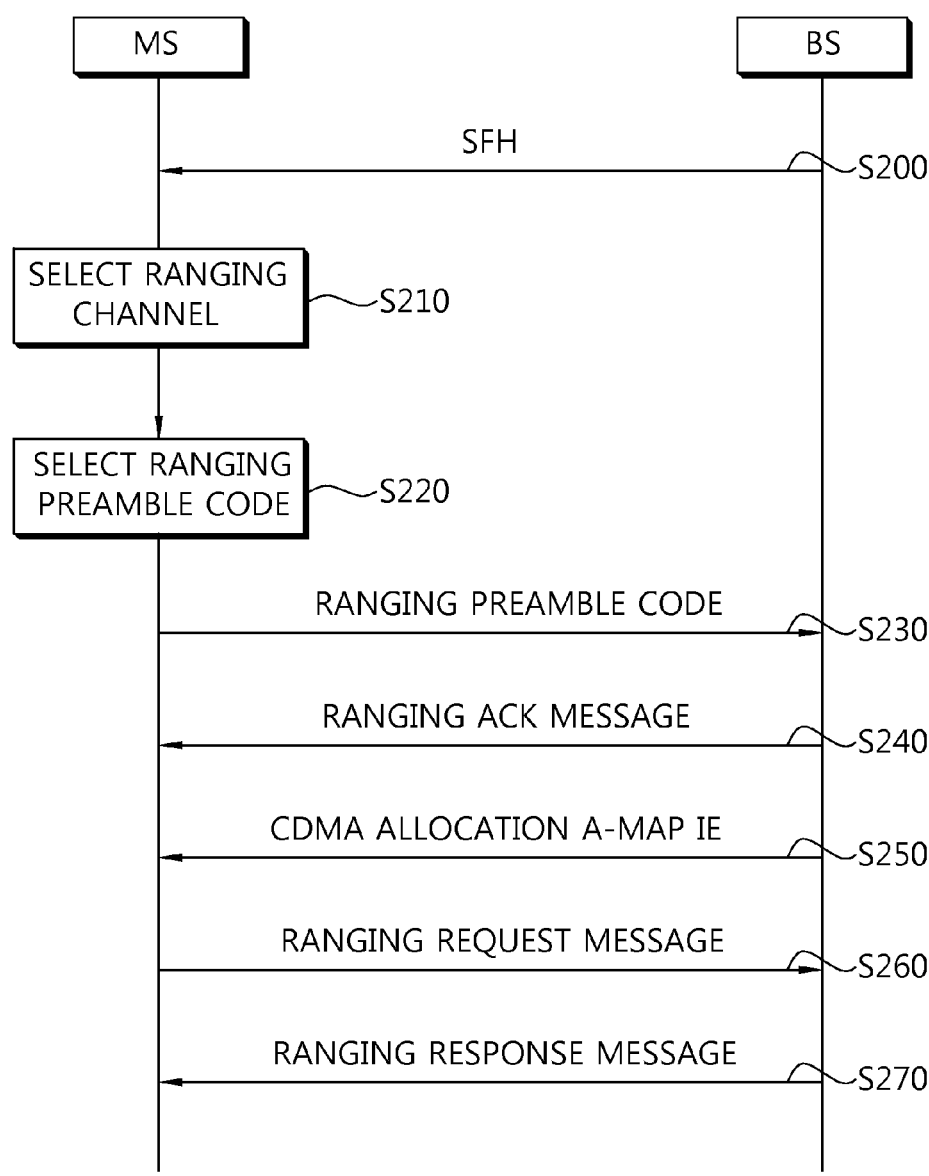
FIG. 7 shows an example of a ranging process of IEEE 802.16m.

FIG. 7 shows an example of a ranging process of IEEE 802.16m.

In step S200, the MS receives an SFH from the BS. The MS may acquire system information including DL and UL parameters for an initial network entry through the SFH.

In step S210, the MS selects one ranging channel by using a random backoff. In this case, the MS selects one ranging channel among all ranging channels which are usable in a corresponding backoff window through a uniform random process. In step S220, the MS selects a ranging preamble code through the uniform random process. In step S230, the MS transmits the selected ranging preamble code to the BS through the selected ranging channel.

In step S240, the base station transmits a ranging acknowledgement (ACK) message when at least one ranging preamble code is detected. The ranging ACK message provides a response to the ranging preamble codes which are successfully received and detected with respect to all ranging opportunities in the frame. The ranging ACK message includes three kinds of ranging status responses of 'continue', 'success', and 'abort'. When the ranging status response is 'continue', the MS adjusts a parameter according to the ACK message and continuously performs the ranging process. When the ranging status response is 'abort', the MS operates a ranging abort timer, and until the ranging abort timer expires, the ranging process is not performed.

In step S250, the BS transmits a CDMA allocation A-MAP IE to the MS. The BS may provide a bandwidth in which the MS transmits the ranging request message by the CDMA allocation A-MAP IE. In step S260, the MS transmits the ranging request message to the BS. In step S270, the BS transmits the ranging response message to the MS, and as a result, the ranging process ends.

Like the ranging process of FIG. 6, even in the ranging process of FIG. 7, the number of ranging retries may be defined. A timer may operate while the MS waits in order to receive the ranging ACK message in step S240, the CDMA allocation A-MAP IE in step S250, or the ranging response message in step S270. When the ranging ACK message, the CDMA allocation A-MAP IE, or the ranging response message is not received until the timer expires, the MS performs the ranging process all over again, and the number of ranging retries is increased by 1. When the ranging is continuously aborted and thus the number of ranging retries reaches a predetermined value, the MS retries downlink physical layer synchronization (DL PHY synchronization).

When the SFH is transmitted, a P-SFH includes S-SFH scheduling information, an S-SFH change count, an S-SFH subpacket (SP) change bitmap, and an S-SFH application hold indicator. The S-SFH change count is not changed so long as values in the S-SFH SP IE are not changed. The S-SFH change count may be changed only in a specific superframe where a remainder acquired by dividing a superframe number (SFN) by an S-SFH change cycle is 0. The S-SFH change cycle may be indicated by an S-SFH IE SP3. The changed S-SFH change cycle is maintained up to a superframe which satisfies the following condition. The S-SFH change count is increased by 1 modulo 16 whenever a value in the S-SFH IE is changed. The S-SFH SP change bitmap is coupled with the S-SFH change count to indicate a status change of the corresponding S-SFH SP IE. The S-SFH SP change bitmap may be 3 bits, and a least significant bit (LSB) is mapped in an S-SFH SP1 IE, the second significant bit is mapped in an S-SFH SP2 IE, and a most significant bit (MSB) is mapped in an S-SFH SP3 IE. In the case where any value in the S-SFH SP IE is changed, a bit value corresponding to the S-SFH SP IE changed in the S-SFH SP change bitmap is set to 1. Only when the S-SFH change count is changed, a value of the S-SFH SP change bitmap may be changed.

Further, the S-SFH SP3 IE may include a system configuration descriptor (SCD) count. The SCD count indicates a configuration change count associated with a system configuration element in a system configuration descriptor (AAI-SCD) message.

Meanwhile, the AAI-SCD message is periodically transmitted from the BS in order to define the system configuration. The configuration change count in the AAI-SCD message may be increased by 1 modulo 16 whenever information in the message is changed. The BS indicates when changed AAI-SCD message to which the SCD count in the S-SFH SP3 is applied and an offset in the P-SFH are applied through the S-SFH. After transmitting the S-SFH SP3 including the same SCD count as the configuration change count in the AAI-SCD message, the BS applies a system configuration which is changed by the AAI-SCD message associated with the SCD count in the S-SFH SP3 when the S-SFH SP3 is updated. The MS receives a recent system configuration of the AAI-SCD message associated with a current SCD count.

Hereinafter, a method for ranging according to embodiments of the present invention will be described.

In order to minimize an effect on human type communication (HTC) devices, a separate ranging channel for only the M2M device may be allocated. In this case, the BS may transmit ranging channel allocation information for the M2M device to the M2M device through the AAI-SCD message. Further, the BS may transmit dedicated ranging code set information for only the M2M device to the M2M device through the AAI-SCD message. The dedicated ranging code set information may be 5 bits, and in this case, may maximally support 32 codes. When the ranging channel allocation information and/or the dedicated ranging code set information are changed, in order to indicate the ranging channel allocation information and/or the dedicated ranging code set information to the M2M device, an M2M parameter change count may be inserted into the AAI-SCD message and a paging advertisement (AAI-PAG-ADV) message. As such, an M2M parameter change count which is different from an existing configuration change count is newly inserted into the AAI-SCD message so as not to influence an existing HTC device.

Further, information on a frequency resource and/or a time resource may be added to the AAI-SCD message as the dedicated ranging information for the M2M device. One additional subband may be further allocated as the frequency resource for the dedicated ranging channel for the M2M device. A position in a logic domain of the corresponding additional subband may be the next index of the ranging subband which is cell-specifically allocated. Or, the additional subband may be a subband which is spaced apart from the ranging subband in the logic domain by a specific offset. The specific offset may be pre-defined or transmitted through the S-SFH. Further, the subframe index may be indicated as a time resource for the dedicated ranging channel for the M2M device. In this case, when the number of UL subframes in the frame is two in the case where maximum one ranging channel per frame, or, maximum two ranging channels per frame, when dynamic ranging is considered, are supported, it is difficult to additionally allocate the dedicated ranging channel for the M2M device. Accordingly, when the number of UL subframes in the frame is two, the dedicated ranging channel for the M2M device is not allocated.

A relationship between the configuration change count in the AAI-SCD message and the SCD count in the S-SFH SP3 IE described above may be equally applied even to the M2M device. That is, the M2M parameter change count in the AAI-SCD message may be increased by 1 modulo 16 whenever information on the dedicated ranging channel is changed regardless of the configuration change count in the existing AAI-SCD message. As a result, the existing configuration change count may be increased by 1 modulo 16 whenever the remaining information except for the information on the dedicated ranging channel is changed. That is, the AAI-SCD message may include a configuration change count and an M2M parameter change count as shown in Table 2.

TABLE 2

| Field | Size | Value/description |
|---|---|---|
| Configuration change count | 4 | - Increased whenever contents except for dedicated ranging information for the M2M device is changed.<br>- Has a value of 0 to 15. |
| . . . | | |
| M2M parameter change count | 4 | - Increased whenever contents of dedicated ranging information for the M2M device is changed.<br>- Has a value of 0 to 15. |
| M2M ranging indicator | 2 | - Indicates a ranging configuration for the M2M device. |

Referring to Table 2, the M2M parameter change count in addition to the existing configuration change count is additionally inserted. As a result, the information on the dedicated ranging channel for the M2M device may be transmitted without influencing the existing HTC device.

Further, the M2M SCD count may be inserted into the S-SFH SP3 IE corresponding to the M2M parameter change count in the AAI-SCD message. That is, the S-SFH SP3 may include the M2M SD count as shown in Table 3.

TABLE 3

| Field | Size | Value/description |
|---|---|---|
| . . . | | |
| M2M SCD count | 4 | - Increased whenever contents of dedicated ranging information for the M2M device is changed.<br>- Has a value of 0 to 15. |
| Multiplexing factor for dedicated ranging code | 3 | - Indicates a multiplexing ratio of the dedicated ranging code. |
| . . . | | |

The BS applies the M2M SCD count in the S-SFH SP3 through the S-SFH to indicate when the changed AAI-SCD message is applied. After transmitting the S-SFH SP3 including the same M2M SCD count as the M2M parameter change count in the AAI-SCD message, the BS applies a system configuration which is changed by the AAI-SCD message associated with the M2M SCD count in the S-SFH SP3 when the S-SFH SP3 is updated. The terminal receives a recent system configuration of the AAI-SCD message associated with a current M2M SCD count.

The M2M parameter change count is added into the AAI-SCD message and the M2M SCD count is added into the S-SFH SP3 IE to thereby efficiently support the dedicated ranging channel. That is, when the dedicated ranging channel is allocated, only the corresponding M2M device supporting the dedicated ranging channel may decode the S-SFH SP3 IE. The existing HTC terminals and the M2M devices not using the dedicated ranging channel for the M2M device may not unnecessarily decode information regarding the dedicated ranging channel. Further, the M2M device using the dedicated ranging channel may always decode the S-SFH SP3 IE. In addition, a field indicating a time information and/or period information indicating the information regarding the dedicated ranging channel may be added into the S-SFH SP3 IE, and the M2M device may decode the S-SFH SP3 IE based on them.

Meanwhile, the information on the size of the ranging window to be used for re-entry may be transmitted to the M2M device through the AAI-PAG-ADV message. In this case, the information on the size of the ranging window may be based on the number of paged M2M devices. Further, the AAI-PAG-ADV message may indicate IDs of the paged M2M devices. In this case, each M2M device may recognize an order of paged of each M2M device itself. That is, the M2M devices may be paged in granted order of the ID of the M2M device. Accordingly, the M2M device implicitly calculates a ranging opportunity through an equation of (paging order mod ranging window size) and attempts the ranging in the corresponding opportunity, when the paging is indicated through the AAI-PAG-ADV message.

Further, when the information on the dedicated ranging code set is transmitted through the AAI-SCD message, the M2M device may recognize an order of a dedicated ranging code set list. Each M2M device selects a ranging code corresponding to (paging order mod the number of ranging codes) in the corresponding ranging opportunity to attempt the ranging. For example, a dedicated ranging code set 1, a dedicated ranging code set 2, and a dedicated ranging code set 3 are transferred to the M2M device in sequence, and when it is assumed that a paging order of a specific M2M device is 2, the corresponding M2M device selects the dedicated ranging code set 2 through 2 mod 3=2 to attempt the ranging. Further, according to the number of the entire paged M2M devices, a plurality of M2M devices is grouped to select a specific dedicated ranging code set. For example, first to 10-th paged M2M devices may select the dedicated ranging code set 1, 11-th to 20-th paged M2M devices may select the dedicated ranging code set 2, and 21-th to 30-th paged M2M devices may select the dedicated ranging code set 3.

Meanwhile, the plurality of M2M devices may be included in the M2M group. The M2M devices included in the same M2M group share a reference of the same M2M service application and/or the same M2M user. The plurality of M2M devices included in the same M2M group may attempt the ranging at the same time, and as a result, collision during the ranging attempt may occur. In order to prevent the collision, like a related art, a random backoff may be used, or a method of uniformly distributing opportunities of the M2M devices included in the M2M group may be proposed. A ranging access type indicator may be included in the AAI-PAG-ADV message so that the BS indicates the method. The ranging access type indicator may be allocated for each M2M group. The ranging opportunities of the plurality of M2M devices in the M2M group may be uniformly distributed according to an indicating method of the ranging access type indicator.

In order to uniformly distribute the ranging opportunities of the plurality of M2M devices, two methods may be proposed. As the first method, the ranging opportunity of each M2M device may be calculated by (ID of M2M device mod ranging window size). That is, the IDs of the M2M devices are sequentially allocated to the M2M devices, and as a result, the ranging opportunity of each M2M device may be uniformly distributed. In this case, the ID of the M2M device may be a device ID (DID). As the second method, the ranging opportunity of each M2M device may be calculated by (paging order mod ranging window size). In this case, the M2M device needs to recognize the paged order. That is, when the M2M devices are paged in the order of the granted IDs of the M2M devices, the order of the granted IDs of the M2M devices represents a paging order, and the ranging opportunity of each M2M device may be uniformly distributed based on the order of the granted IDs of the M2M devices. Meanwhile, the ranging window size may be notified by the BS through the AAI-PAG-ADV message based on the number of paged M2M devices. As such, it is possible to prevent collision of the ranging attempts of the M2M devices in the M2M group.

Figure 8:
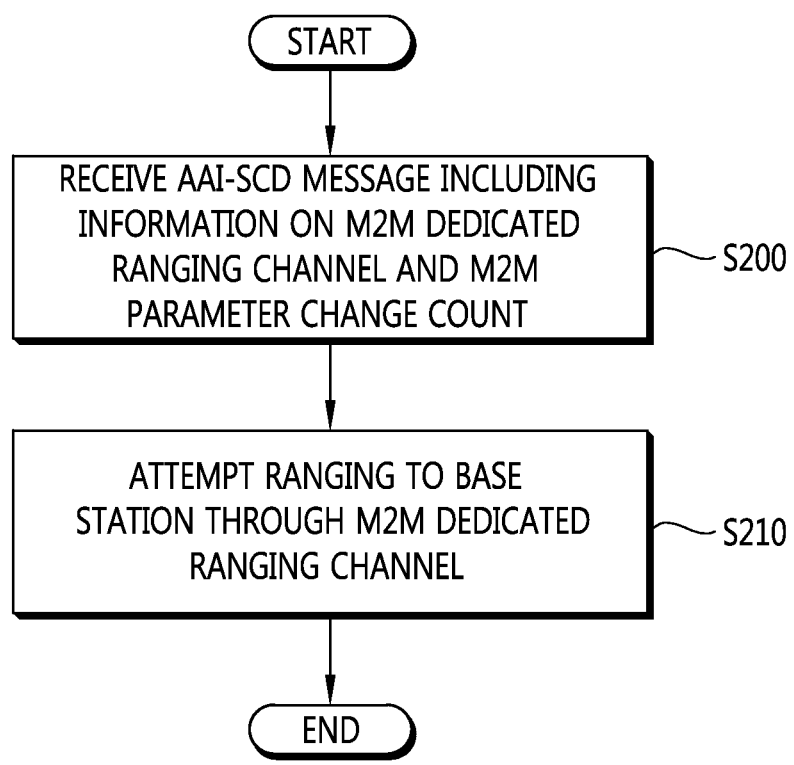
FIG. 8 shows an embodiment of a method for ranging to be proposed.

FIG. 8 shows an embodiment of a method for ranging to be proposed.

In step S200, an M2M device receives an AAI-SCD message including information on a dedicated ranging channel for the M2M device and an M2M parameter change count from a base station. In step S210, the M2M device attempts ranging to the base station through the dedicated ranging channel. In this case, the M2M parameter change count indicates that the information on the dedicated ranging channel in the AAI-SCD message is changed.

Figure 9:
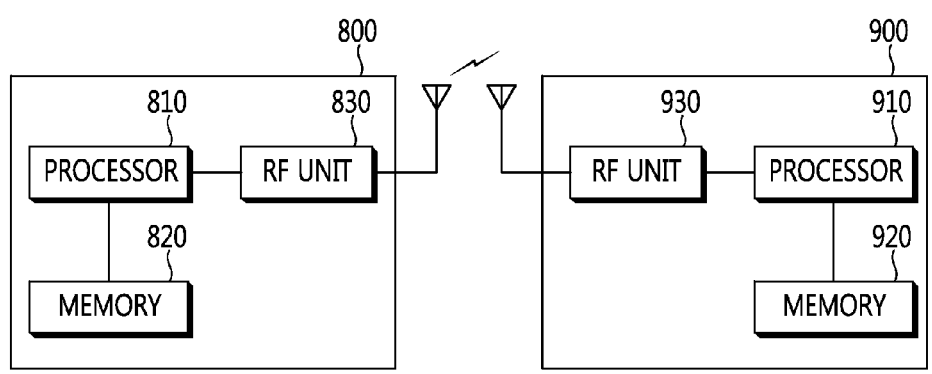
FIG. 9 is a block diagram showing wireless communication system to implement an embodiment of the present invention.

FIG. 9 is a block diagram showing wireless communication system to implement an embodiment of the present invention.

A BS 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

An M2M device 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for ranging, by a machine-to-machine (M2M) device, in a wireless communication system, the method comprising:
receiving an opportunity index included in a random access identifier (RA-ID),
wherein the opportunity index is masked with a CDMA allocation A-MAP information element (IE),
receiving an Advanced Air Interface-System Configuration Descriptor (AAI-SCD) message including information on a dedicated ranging channel for the M2M device and a M2M parameter change count from a base station; and
transmitting a ranging request message to the base station through the dedicated ranging channel,
wherein the M2M parameter change count indicates that the information on the dedicated ranging channel in the AAI-SCD message has changed, and
wherein the information on the dedicated ranging channel for the M2M device relates to a M2M ranging indicator indicating dedicated ranging for the M2M device.

2. The method of claim 1, wherein the M2M parameter change count is increased by 1 mod 16 whenever the information on the dedicated ranging channel.

3. The method of claim 1, wherein the M2M parameter change count is an integer from 1 to 15.

4. The method of claim 1, wherein the AAI-SCD message includes information on a set of dedicated ranging codes for the M2M device.

5. The method of claim 4, wherein the ranging request message is based on one dedicated ranging code selected from among the set of dedicated ranging codes.

6. The method of claim 5, wherein the one dedicated ranging code is a dedicated ranging code corresponding to a paging order mod the number of dedicated ranging codes.

7. The method of claim 1, further comprising receiving a paging advertisement (AAI-PAG-ADV) message including the M2M parameter change count.

8. The method of claim 7, wherein the AAI-PAG-ADV message includes a ranging window size determined based on the number of paged M2M devices.

9. The method of claim 8, wherein transmitting the ranging request message comprises:
transmitting the ranging request message during a ranging opportunity calculated by a paging order mod the ranging widow size.

10. The method of claim 8, wherein the ranging is attempted in a ranging opportunity calculated by an identifier (ID) of the M2M device mod the ranging widow size.

11. The method of claim 7, wherein the AAI-PAG-ADV message includes a ranging access type indicator for a M2M group in which the M2M device is included.

12. A machine-to-machine (M2M) device in a wireless communication system, the M2M device comprising:
a radio frequency (RF) transmitter/receiver that transmits and receives radio signals; and
a processor that controls the RF transmitter/receiver to:
receive an opportunity index included in a random access identifier (RA-ID),
wherein the opportunity index is masked with a CDMA allocation A-MAP information element (IE),
receive an Advanced Air Interface-System Configuration Descriptor (AAI-SCD) message including information on a dedicated ranging channel for the M2M device and a M2M parameter change count from a base station,
transmit a ranging request message to the base station through the dedicated ranging channel,
wherein the M2M parameter change count indicates that the information on the dedicated ranging channel in the AAI-SCD message has changed, and
wherein the information on the dedicated ranging channel for the M2M device relates to a M2M ranging indicator indicating dedicated ranging for the M2M device.

13. The M2M device of claim 12, wherein the M2M parameter change count is increased by 1 mod 16 whenever the information on the dedicated ranging channel.

14. The M2M device of claim 12, wherein the M2M parameter change count is an integer from 1 to 15.

15. The M2M device of claim 12, wherein the AAI-SCD message includes information on a set of dedicated ranging codes for the M2M device.

16. The method of claim 1, wherein the M2M ranging indicator has a size of 2 bits.

17. The M2M device of claim 12, wherein the M2M ranging indicator has a size of 2 bits.

* * * * *